Oct. 18, 1938.  K. RABE ET AL  2,133,633
MOTOR VEHICLE CHASSIS
Filed June 5, 1935  3 Sheets-Sheet 1

K. Rabe & W. Boxan
INVENTORS

By: Glascock Downing & Seebold

Oct. 18, 1938.  K. RABE ET AL  2,133,633
MOTOR VEHICLE CHASSIS
Filed June 5, 1935   3 Sheets-Sheet 2
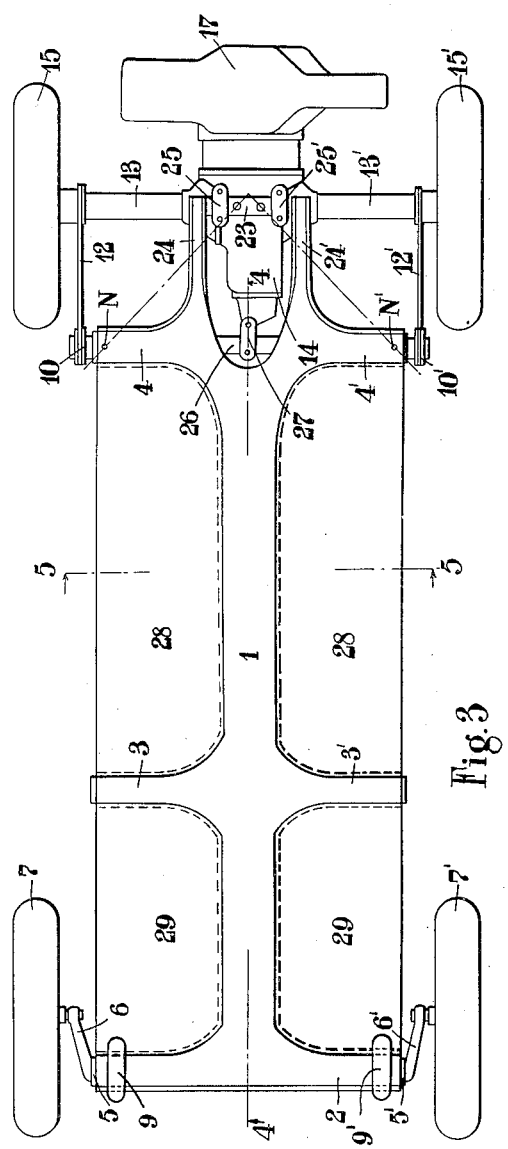
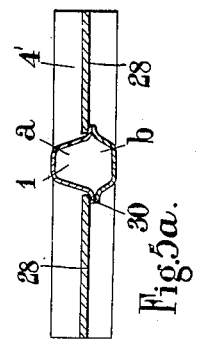
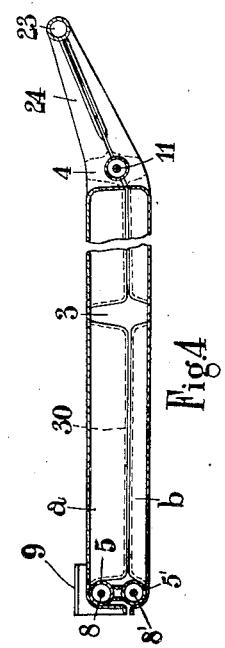
K. Rabe & W. Boxan
INVENTORS
By Glascock Downing & Seebold
Attys.

Oct. 18, 1938.     K. RABE ET AL     2,133,633
MOTOR VEHICLE CHASSIS
Filed June 5, 1935     3 Sheets-Sheet 3
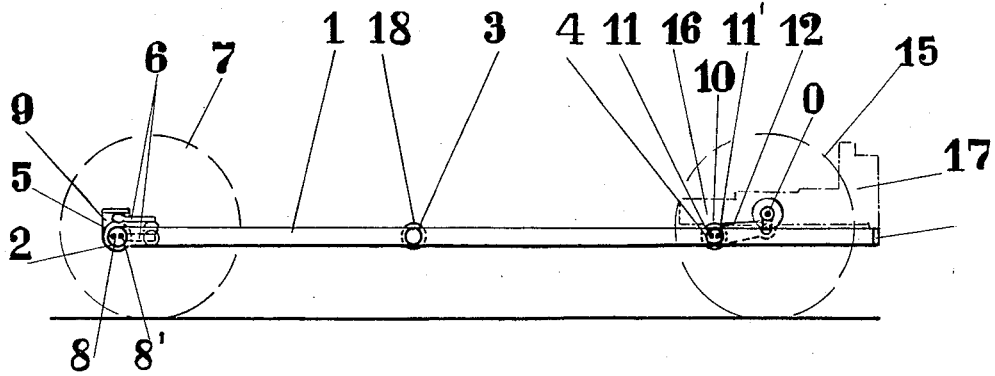
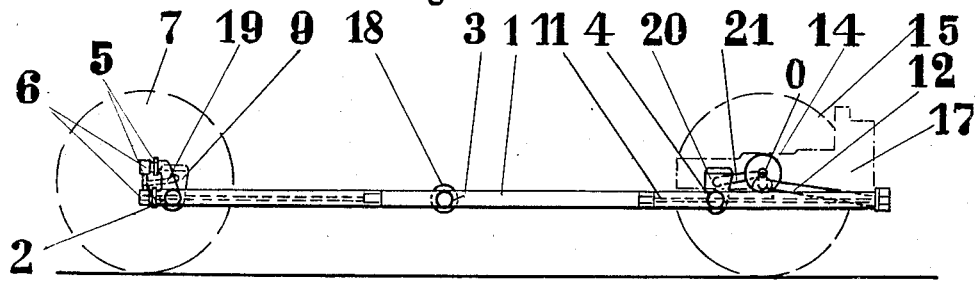
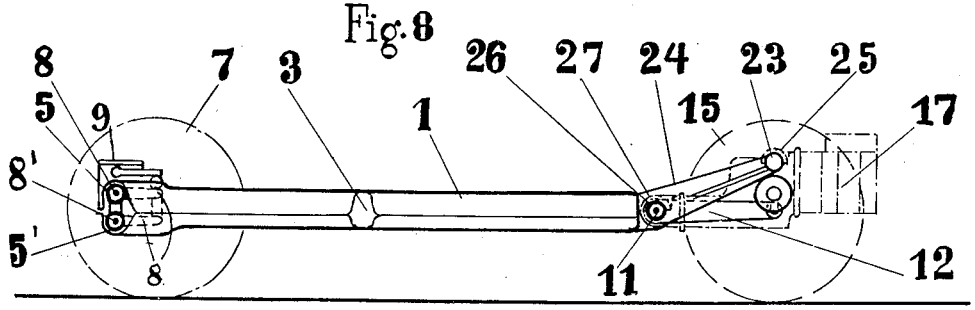
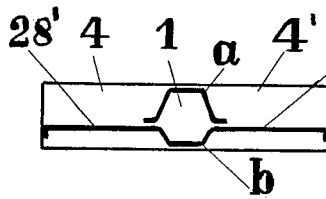
*Inventor:*
K. RABE & W. BOXAN.
by
A. A. Llishe
*Attorney*

Patented Oct. 18, 1938

2,133,633

UNITED STATES PATENT OFFICE 2,133,633

MOTOR VEHICLE CHASSIS

Karl Rabe and Walter Boxan, Stuttgart, Germany; said Boxan assignor to Dr. Ing. 1. c. F. Porsche G. m. b. H., Stuttgart, Germany Application June 5, 1935, Serial No. 25,139
In Germany March 5, 1934

16 Claims. (Cl. 280—106.5)

This invention relates to a chassis for motor vehicles, comprising swinging levers or swinging half axles supporting the wheels, which are acted on by torsion springs, and a lattice-like vehicle frame consisting of hollow supporting members with projecting ends.

It has already been proposed to dispose the bearings for the swinging levers on the tubular, longitudinally extending members of a lattice-like frame, the projecting ends of these longitudinal members remaining substantially unstressed. This mode of construction has the disadvantage that the supporting pin axes cross the frame member axes at a considerable distance, causing appreciable additional stresses among the bearing forces to act on the frame. This manner of supporting the swinging levers furthermore necessitates a great amount of additional space for housing the springs and shock absorbers. It has also been proposed to support the swinging levers in casings which are connected through the intermediary of the U-shaped longitudinal frame members with the ends of a tubular transverse frame member. The bearing casings which replace the projecting ends of the transverse frame member are in this case heavy structural parts which are inconvenient to fix, so that, in spite of the springs and shock absorbers being more easily housed, no reliably operating and economical construction results.

In contradistinction thereto the invention consists in this, that at the freely projecting ends of the longitudinal and transverse frame members the bearings for the swinging levers, spring levers and shock absorber levers are disposed. This arrangement enables the supporting pin axes to be brought extremely close to the frame member axes, so that no appreciable additional stresses can be produced at these places. Through all levers being supported at the extreme ends of the frame members, it also becomes possible to make the supporting surface of the chassis extremely large and at the same time to keep the power transmission path extremely small. In this mode of construction the housing of the springs and shock absorbers may be greatly facilitated and their accessibility improved. As the supports for all the levers are brought very close to the vehicle wheels, it also becomes possible to avoid unfavourable crankings of the same and greatly to shorten their freely projecting parts. Through this mode of construction the operative and constructional features of the chassis of this kind are greatly improved.

The arrangement according to the invention is illustrated by three constructional examples in the accompanying drawings in which:

Fig. 3 is a plane view of a third modified form of this invention;

Fig. 4 is a cross-sectional view in reduced scale along the lines IV—IV of Fig. 3;

Fig. 5a is a cross-sectional view along the lines V—V of Fig. 3;

Fig. 5b is a cross-sectional view similar to Fig. 5a showing a slightly different arrangement;

Fig. 6 is a side view of the arrangement illustrated in Fig. 1;

Fig. 7 is a side view of the modification shown in Fig. 2; and

Fig. 8 is a side view of the modification illustrated in Fig. 3.

Figure 1:
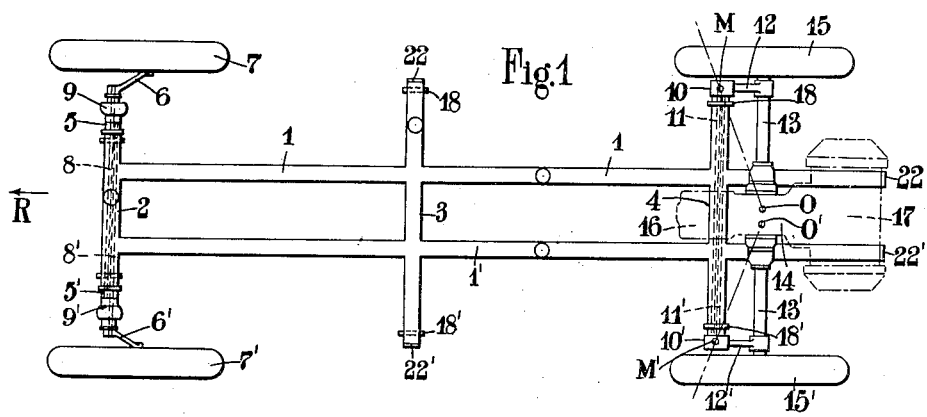
Fig. 1 is a plane view of one form of arrangement according to this invention.

In the example shown in Figs. 1 and 6 the lattice-like frame consists of two parallel longitudinal tubes, 1, 1' and three parallel transverse tubes 2 to 4, the longitudinal tubes 1, 1' projecting freely beyond the rear transverse tube 4 and the transverse tubes 2 to 4 projecting freely beyond the longitudinal tubes 1, 1'. The projecting ends of the transverse tube 2 at the forward end support the bearing casings 5, 5' for the levers 6, 6' which swing parallel to one another in a substantially vertical longitudinal plane; the reference character R indicates the direction of travel of the vehicle. These levers are disposed in pairs one above the other and are connected each by a joint with the steering swivel carriers of the steering wheels 7, 7', so that the latter are supported by a parallel motion arrangement. The supporting pins of the lower swinging levers are respectively connected directly with the spring bars 8, 8' and the supporting pins of the upper swinging levers with the shock absorbers 9, 9'. The spring bars 8, 8' which extend across the full width of the frame are enclosed parallel next to one another in the transverse tube 2 and the shock absorbers 9, 9' in the bearing casings 5, 5'. The projecting ends of the rear transverse member 4 support the bearing casings 10, 10' for the torsion pins of the spring bars 11, 11' which extend over the full width of the frame. The torsion pins are connected by suitable universal joints M, M' with the swinging struts 12, 12' of the half-axles 13, 13'. The half-axles 13, 13' are supported by ball and socket joints O, O' in the axle casing 14 and support the driving wheels 15, 15'. As the levers 12 and 12' are firmly attached to respective half-axles 13, 13', the wheels 15, 15' will swing at an angle to one another about the geometrical axes MO and M'O' respectively. The axle casing 14 forms one block with the forwardly extending change speed gear casing 16 and the rearwardly extending engine casing 17. The engine gearing block is supported on the projecting ends of the longitudinal tubes 1, 1'. The vehicle body (not shown) is supported at the projecting ends of the transverse tubes 2 to 4 by means of slipped-on rubber rings 18, 18' and secured by shackles. The projecting ends of the middle transverse tube 3 are tightly closed by plugs 22, 22'.

In this constructional form the bearings 5, 5' and 10, 10' of the swinging and spring levers 6, 6' and 12, 12' are in each case disposed at the ends of the same frame members. Since the supports 18, 18' of the vehicle body are also disposed on the ends of these members, an arrangement of the lines of force results, under a stationary load, which is substantially limited to the frame member ends. But even with a moving load the force equalization will take place, in each case along the shortest path between the frame member ends. The ends of the transverse members 2, 4 are brought very near to the wheels 7, 7' and 15, 15', so that the levers 6, 6' and 12, 12' become relatively short and the supporting surface lying between its bearings 5, 5' and 10, 10' can be made relatively large. The frame member ends are correspondingly reinforced by the bearing casings 5, 5' and 10, 10' and the spring bars 8, 8' and 11, 11', which are enclosed in the frame members, and are at the same time protected by these bearing casings from all external influences.

Figure 2:
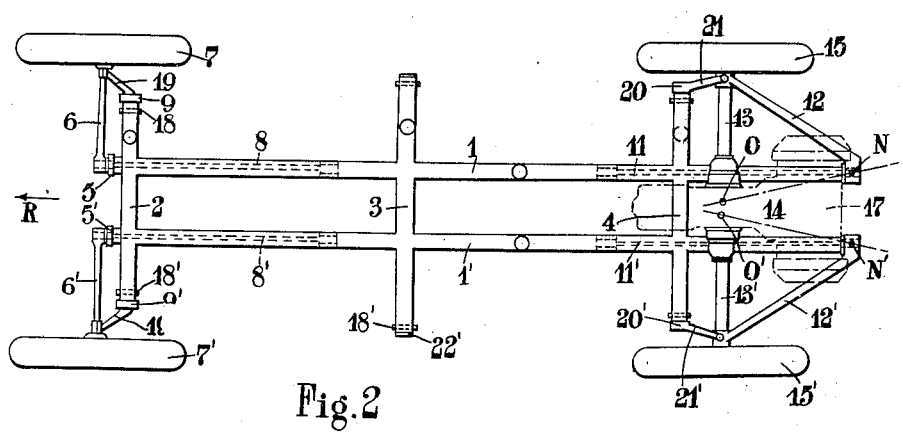
Fig. 2 is a plane view of a second form of arrangement according to this invention.

In the constructional example shown in Figs. 2 and 7 the lattice-like frame is constructed in a similar manner, with the exception that the longitudinal tubes 1, 1' are extended beyond the forward transverse tube 2 as well. The forward ends of the longitudinal tubes 1, 1' support the bearing casings 5, 5' for the levers 6, 6' which swing parallel to one another at right angles to the direction of travel R and form a parallel motion arrangement for supporting the steering wheels 7, 7'. The supporting pivots of the lower swinging levers are respectively connected directly to the spring bars 8, 8' which are enclosed in the longitudinal tubes 1, 1'. At the projecting ends of the forward transverse frame member 2 the absorbers 9, 9' are mounted, which through the shock absorber levers 19, 19' act on the steering swivels of the wheels 7, 7'. At the rear ends of the longitudinal tubes 1, 1' the hubs of the swinging struts 12, 12' are mounted in the tubes with interposed rubber joints or bearings N, N', these hubs being connected directly to the spring bars 11, 11' which are enclosed in the longitudinal tubes 1, 1'. The swinging struts 12, 12' support with respect to the frame the half-axles 13, 13' which are supported by ball and socket joints O, O' in the axle casing 14, so that the driving wheels 15, 15' swing at an angle to one another about the geometrical axes ON and O'N' respectively. To the projecting ends of the rear transverse tube 4 shock absorbers 20, 20' are connected, which act through the shock absorber levers 21, 21' on the half-axles 13, 13'. The engine gearing block and the vehicle body are connected with the chassis in the same way as shown in Figs. 1 and 6.

In this constructional form the bearings 5, 5' and N, N' of the swinging and spring levers 6, 6' and 12, 12' respectively and of the shock absorber levers 19, 19' and 21, 21' are in each case disposed at the various frame member ends. By this means the springing and damping forces can be distributed in each case separately to oppositely disposed frame member ends. Furthermore, the supporting surface between the bearings 5, 5' and N, N' and the shock absorbers 9, 9' and 20, 20' can be increased to the maximum amount. Finally the swinging levers 6, 6' and 12, 12' may be made relatively long and the shock absorber levers 19, 19' and 21, 21' relatively short, which enables spring and shock absorbers of any size to be used and a favourable balance of the two with respect to one another to be effected.

In the constructional example shown in Figs. 3, 4, 5a, 5b and 8 the lattice-like frame consists of one central member 1, which divides at the rear into two upwardly bent prongs 24, 24', and of three transverse members 2 to 4 projecting like teeth on either side. The frame is built up from two channel-shaped parts a, b with a substantially horizontally extending joint, which are provided with similar pressed out flanges extending all round. The bearings 5, 5' for the swinging levers 6, 6', which are disposed one above the other and support the steering wheels 7, 7', are inserted at the ends of the transverse frame member 2 and the bearings 10, 10' for the swinging struts 12, 12' which additionally support the driving wheels 15, 15' journalled on the swinging half-axles 13, 13' are inserted at the ends of the transverse frame member 4, in each case between the frame parts a, b. The pivots of the swinging levers 6, 6' and of the swinging struts 12, 12' are connected directly with the transversely extending spring bars 8, 8' and 11, which are secured in the middle against turning in the frame. At the prongs 24, 24' the supporting tubes 23, 26 for the engine gearing block which is suspended in three points 25, 25' and 27 are inserted between the frame parts a, b. Between the longitudinal central member 1 and the transverse members 2 to 4 floor plates 28, 29 are inserted, which consist either of wood, in which case they rest on the peripheral pressed flanges 30 of the frame parts a, b (Fig. 5a), or consist of the frame material itself, in which case they are made integral with the lower part b of the frame (Fig. 5b). For making them more rigid the wood plates 28, 29 may be made of plywood and for the same purpose the metal plates 28' may be provided with depressions or corrugations.

In this constructional form the interior of the frame may be made accessible for the introduction of the torsion springs, shock absorbers and bearings and, as the dividing joint lies in the neutral axis of the profile of the frame there is no appreciable weakening of the latter. The two channelled frame parts can be produced by pressing and connected together right along their pressed flanges. At the same time the bearings for the swinging and spring levers and for the engine gearing block can be inserted between these two frame parts, being fixed, for instance being clamped between them, so that it is possible to fix them both simply and securely at very low cost. It is also possible to insert between the longitudinal and transverse members of these frame parts floor plates which either rest on the pressed flanges of the frame parts or are connected with them throughout. In this way a continuous plate form is obtained, which is of great bending and twisting strength and on which any kind of vehicle body can be mounted.

The invention is not limited to these constructional examples. In place of the frame tubes other closed hollow supporting members may be used and in place of the spring bars other torsion springs, for instance cylindrical helical springs may be used. Any kind of shock absorber may be used. How the various bearings for the swinging, spring and shock absorber levers are constructed is immaterial as regards the invention. Individual transverse members, for instance the forward transverse member 2, may be made separately and be inserted subsequently into the lattice-like frame, so that the axle or driving groups may be removed as complete units.

What we claim is:

1. In a vehicle chassis, in combination, a frame comprising hollow longitudinal and transverse members having free projecting ends, bearings positioned within said members at the extremities of said projecting ends, wheel supporting levers mounted for rotation in said bearings for independently supporting the vehicle wheels, rotary spring means positioned within said hollow frame members attached thereto at one end and to said levers at their other ends for resiliently connecting said wheel supporting levers to said frame, and shock absorbers having one portion attached to said frame and another portion to certain of said levers.

2. A chassis for motor vehicles comprising swinging members for supporting the wheels, torsion springs acting upon the swinging members, shock absorbers, shock absorber levers, a frame consisting of hollow longitudinal and transverse supporting members with projecting ends, and bearings at the ends of the longitudinal and transverse supporting members for the swinging members and shock absorber levers.

3. A chassis for motor vehicles comprising swinging members for supporting the wheels, torsion springs acting upon the swinging members, shock absorbers, shock absorber levers, a frame consisting of hollow longitudinal and transverse supporting members with projecting ends, bearings at the ends of the transverse members for the shock absorber levers, and bearings at the ends of the longitudinal members for the swinging members.

4. In a vehicle, in combination, a frame comprising hollow longitudinal and transverse members, said frame being formed of two channelled parts connected by substantially horizontally extending flanged joint, said flanged joint being adapted to form at least a part of the vehicle floor structure, wheels for said vehicle, and means carried within said hollow members for supporting said wheels.

5. The combination according to claim 4 in which said last means includes spring means carried within said hollow members.

6. The combination according to claim 4 in which said frame includes a pair of longitudinally extending freely projecting ends which are adapted to receive engine and transmission block bearings between the two channel parts at said projecting ends.

7. A chassis for motor vehicles comprising swinging members for supporting the wheels, rotary spring means acting upon the swinging members, a frame comprising hollow longitudinal and transverse members, formed of two channelled parts connected by a joint extending substantially horizontally, and bearings at the ends of the transverse supporting members for the swinging members.

8. A chassis for motor vehicles comprising swinging members for supporting and guiding the wheels, rotary spring means acting upon certain of the swinging members, a frame comprising hollow longitudinal and transverse supporting members with free projecting ends, and bearings at the ends of the longitudinal and transverse supporting members for the swinging members.

9. In a vehicle, in combination, a frame consisting of a plurality of hollow longitudinal and transverse supporting members, wheels for said vehicle, a pair of swinging members for connecting one of said wheels to said frame independently of the other wheels, at least one of said swinging members being journaled wholly within one of said hollow frame members, and spring means within said last hollow frame member attached at one end to said journal swinging member and at its other end to said frame.

10. The combination according to claim 9 in which said spring means is a torsion bar.

11. The combination according to claim 9 in combination with shock absorbing means attached to said frame, and means for operatively connecting the other swinging member to said shock absorbing means.

12. A chassis for motor vehicles comprising swinging members for supporting the wheels, springs acting upon the swinging members, shock absorbers, shock absorber levers, a frame consisting of hollow longitudinal and transverse supporting members having flanges, bearings at the ends of the supporting members for the swinging members and shock absorber levers, and floor plates secured upon said flanges.

13. A vehicle frame comprising a pair of sheet metal plates each pressed to form a longitudinal central channel section and a plurality of transverse channel sections, and means for attaching said plates together at their open channel sides, thereby forming hollow frame members adapted to receive wheel supporting means for the vehicle.

14. A unitary vehicle frame comprising a pair of sheet metal plates each pressed to form a flanged longitudinal channel and a plurality of transverse flanged channels extending on opposite sides of said longitudinal channel, said channel being positioned one above the other and attached together at their open flanged channel sides.

15. The combination according to claim 14 in which the flanges on the lower pressed plate form the floor of the vehicle.

16. The combination according to claim 14 in which one end of each of said plates is pressed to form a pair of obliquely upwardly freely extending flanged longitudinal channels, and means for attaching the ends of said channels together, said means together with one of said transverse channels adapted to form a support for an engine transmission.

KARL RABE.
WALTER BOXAN.